(12) United States Patent
Daoud et al.

(10) Patent No.: US 6,330,389 B1
(45) Date of Patent: Dec. 11, 2001

(54) SYSTEM FOR ORGANIZING OPTICAL FIBERS

(75) Inventors: Bassel Hage Daoud, Parsippany; Christopher M. Helmstetter, Bridgewater; Garth A. Newell, Irvington, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/442,545

(22) Filed: Nov. 18, 1999

(51) Int. Cl.[7] .................................................. G02B 6/00
(52) U.S. Cl. ........................... 385/135; 385/134; 385/137
(58) Field of Search ...................................... 385/134–138

(56) References Cited

U.S. PATENT DOCUMENTS

| | | | |
|---|---|---|---|
| 4,913,522 | * 4/1990 | Nolf et al. | 385/95 |
| 5,069,516 | * 12/1991 | Kohy et al. | 385/147 |
| 5,155,794 | 10/1992 | Nolf et al. | 385/135 |
| 5,249,253 | 9/1993 | Franckx et al. | 385/135 |
| 5,396,575 | 3/1995 | Hayward et al. | 385/135 |
| 5,602,954 | 2/1997 | Nolf et al. | 385/135 |
| 5,758,002 | * 5/1998 | Walters | 385/134 |
| 5,825,962 | * 10/1998 | Walters et al. | 385/135 |

* cited by examiner

Primary Examiner—Hemang Sanghavi
Assistant Examiner—Omar Rojas
(74) Attorney, Agent, or Firm—Duane Morris & Heckscher LLP; Steven E. Koffs

(57) ABSTRACT

A fiber storage system includes one or more splice holder assemblies and one or more fiber routing devices. The splice holder assembly has a sleeve in the shape of a closed figure having a plurality of substantially flat sides or a ring. The sleeve has a plurality of holes on its sides. At least one splice holder is mounted on the side walls of the sleeve, near one or more of the holes. The fiber routing device includes a sleeve in the shape of a closed figure having a plurality of substantially flat sides or a ring, and a plurality of troughs attached to an outer surface of the top portion of the sleeve. The splice holder assemblies may be stacked on top of each other, or on top of the fiber routing devices. The fiber routing devices may be stacked on top of each other, or on top of the splice holder assemblies. The stack of splice holder assemblies and fiber routing devices form a pedestal for routing and terminating optical fibers. The fibers can be routed outside of the pedestal between splice holders at different levels, and between splice holders on different sides of the pedestal.

23 Claims, 4 Drawing Sheets

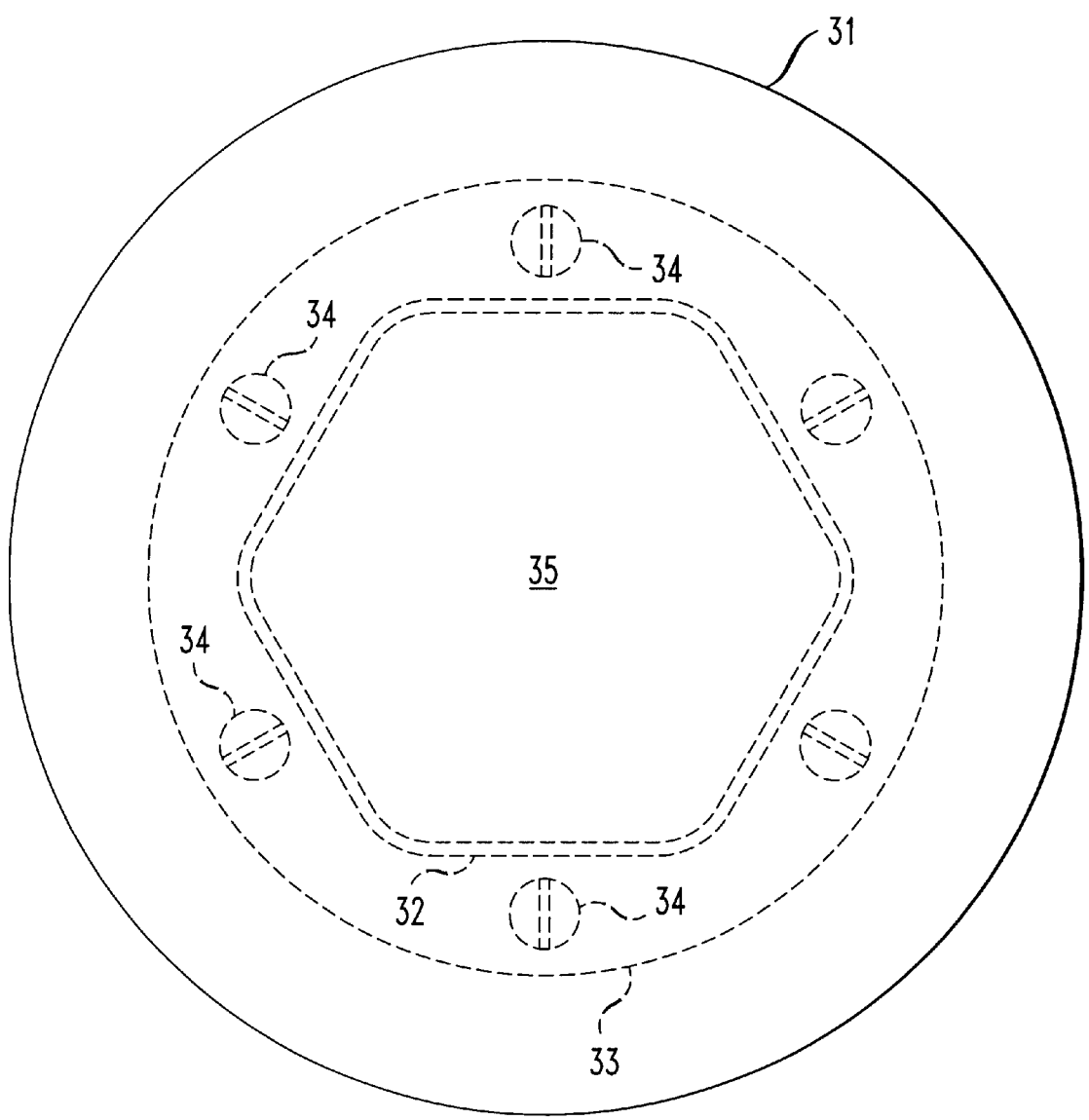

SYSTEM FOR ORGANIZING OPTICAL FIBERS

FIELD OF THE INVENTION

The present invention relates to telecommunications equipment generally, and more specifically to enclosures for optical fibers.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation. U.S. Pat. No. 5,069,516 to Kohy et al. and U.S. Pat. No. 5,396,575 to Hayward et al. are expressly incorporated by reference herein in their entireties for their teachings on sealed fiber enclosures.

U.S. Pat. Nos. 4,913,522, 5,155,794 and 5,602,954 to Nolf et al., and U.S.

Pat. No. 5,249,253 to Franckx et al. are expressly incorporated by reference herein in their entireties. These patents describe an enclosure for a butt splice of optical fiber cables.

The systems described in the above mentioned patents include a plurality of hinged fiber splice trays. To use a selected one of the trays, it is necessary to pivot any tray above the selected tray. A separate apparatus is described for selectively exposing respective trays. The apparatus is hinged so that a bar can move to allow selected trays to be held in an upright position for working on those trays.

The above described apparatus for selectively exposing trays is bulky and cumbersome to use. Other, more convenient methods have been sought to allow one of the splice trays to be selectively exposed for installation or repair of a splice. In one example, a clip has been inserted in the hinged corner between the exposed horizontal tray and the adjacent (unexposed) vertical tray immediately above the exposed tray. The clip prevents the adjacent vertical tray from pivoting downward about its hinge, maintaining the horizontal tray exposed. Although the clip is compact, it is easily lost. Further, if the worker forgets to remove the clip when the work is completed, either the clip or the trays, or both, may be damaged when the vertical trays are lowered.

In addition, the above described tray systems are designed to accommodate a large number of fibers, and may not be economically practical for configurations that (at least initially) do not involve a large number of fibers.

An improved and economical fiber organizer system is desired.

SUMMARY OF THE INVENTION

One aspect of the present invention is a device for routing optical fiber, including a sleeve and a plurality of troughs. The sleeve has the shape of either: (a) a closed figure having a plurality of substantially flat sides or (b) a ring. The sleeve has a top portion, a bottom portion, and a shoulder connecting the top and bottom portions. One of the top portion and the bottom portion has an inner dimension that is larger than the outer dimension of a corresponding location on the other of the top and bottom portions. The plurality of troughs are attached to an outer surface of the sleeve.

Another aspect of the invention is a fiber storage system, including at least one splice holder assembly and at least one fiber routing device. The splice holder assembly includes a sleeve in the shape of a closed figure having a plurality of substantially flat sides or a ring. The sleeve has at least one hole in at least one side thereof. The splice holder assembly also includes at least one splice holder mounted on the side wall of the sleeve, near the hole. The fiber routing device includes a sleeve in the shape of a closed figure having a plurality of substantially flat sides or a ring, and a plurality of troughs attached to an outer surface of the sleeve. At least one of the splice holder assembly or the fiber routing device is stackable on the other one of the splice holder assembly and the fiber routing device.

Still another aspect of the invention is a method for routing fiber, including the steps of: (a) providing first and second splice holders and at least one trough, the trough being on a different level from either one of the first and second splice holders; and (b) routing a fiber from the first splice holder to the second splice holder by way of the at least one trough.

The above and other features of the present invention will be better understood from the following detailed description of the exemplary embodiment of the invention which is provided in connection with the accompanying drawings.

BRIEF DESCRIPTION OF THE DRAWINGS

FIG. 6 is a top plan view of the pedestal base shown in FIG. 1.

DETAILED DESCRIPTION

Figure 1:
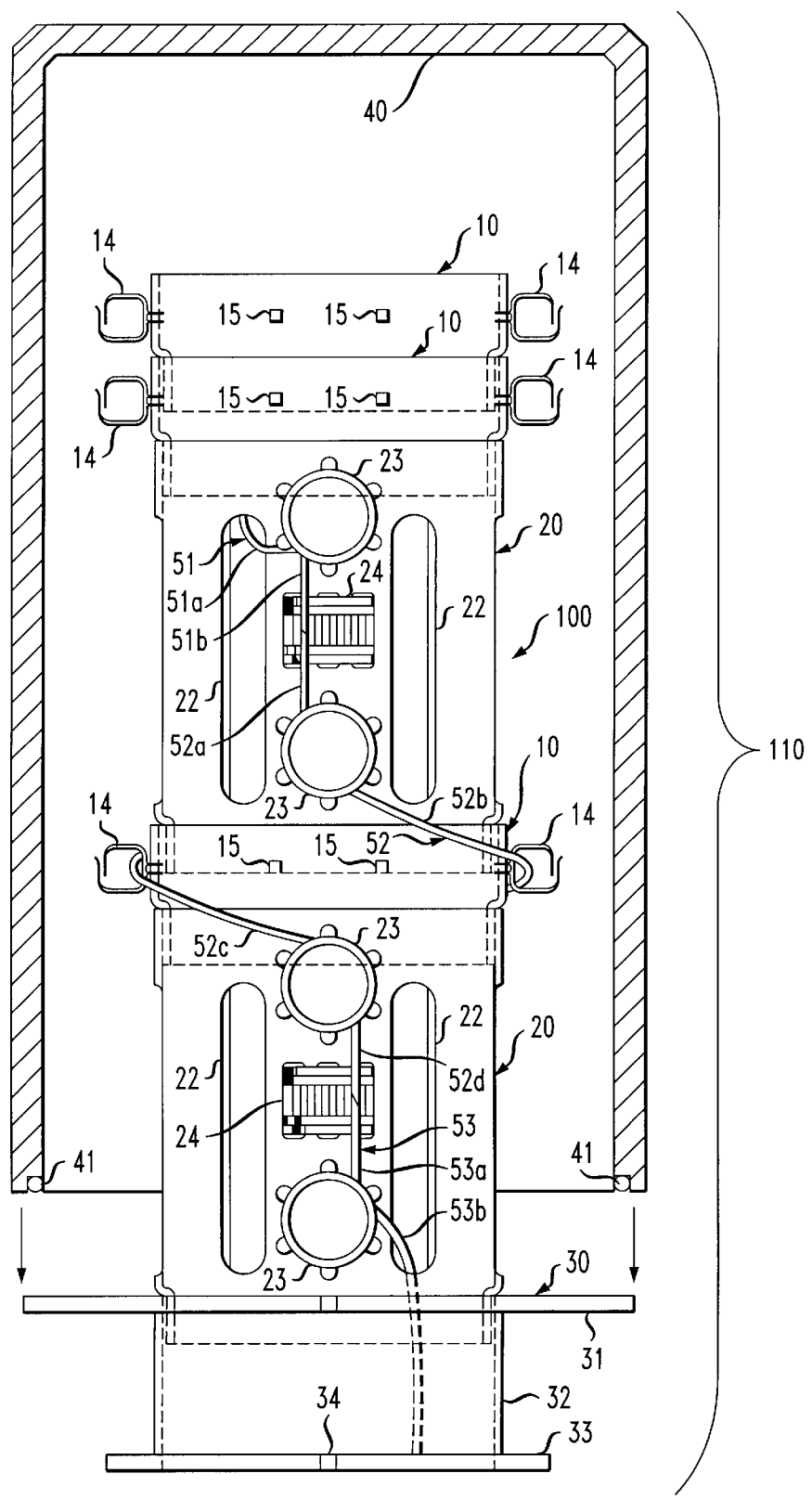
FIG. 1 is a front elevation view of a fiber storage system according to the present invention, with the cover cut away to show the fiber pedestal assembly inside.

FIG. 1 is an elevation view of a fiber storage system 110 including a fiber routing device 10 according to the present invention. The system 110 includes at least one splice holder assembly 20 and at least one fiber routing device 10. The splice holder assemblies 20 and fiber routing devices 10 are stacked together to form a pedestal 100. The exemplary pedestal 100 has two splice holder assemblies 20 and three fiber routing devices 10, but pedestals are contemplated including any combination of one or more splice holder assemblies 20 and one or more fiber routing devices 10.

As shown in FIG. 1, it is possible to stack a splice holder assembly 20 beneath or on top of a fiber routing device 10. Although not shown, two splice holder assemblies 20 may be stacked atop one another without an intervening fiber routing device 10. Nevertheless, to improve routing flexibility, it may be preferred to have one or more fiber routing devices 10 between any pair of splice holder assemblies 20. As shown in the exemplary embodiment, a fiber routing device 10 may be beneath or on top of a splice holder assembly 20 or another fiber routing device 10.

The system 110 further includes an enclosure. The enclosure has a base 30 and a cover 40. The base 30 is positioned beneath a bottommost splice holder assembly 20 or fiber routing device 10. The bottom flange 33 of base 30 is fastened (e.g., using bolts) to a suitably stable surface, such as concrete. The cover 40 engages the base plate 31 to form a sealed enclosure around the pedestal 100. Preferably, a gasket or seal 41 is used to prevent ingress of moisture.

Figure 2:
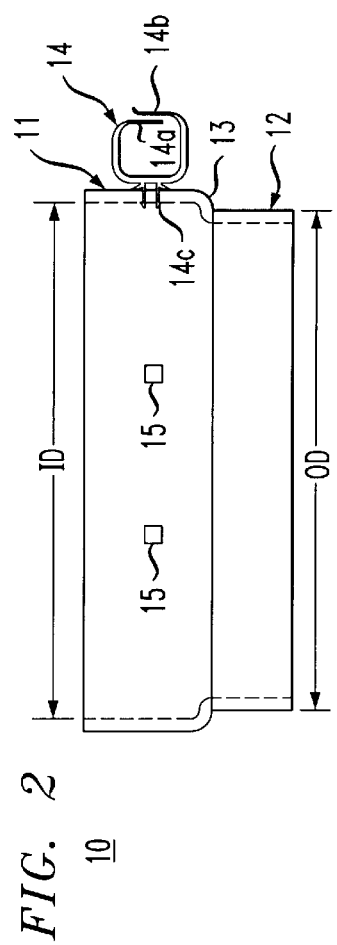
FIG. 2 is a front elevation view of the exemplary fiber routing device shown in FIG. 1.
Figure 3:
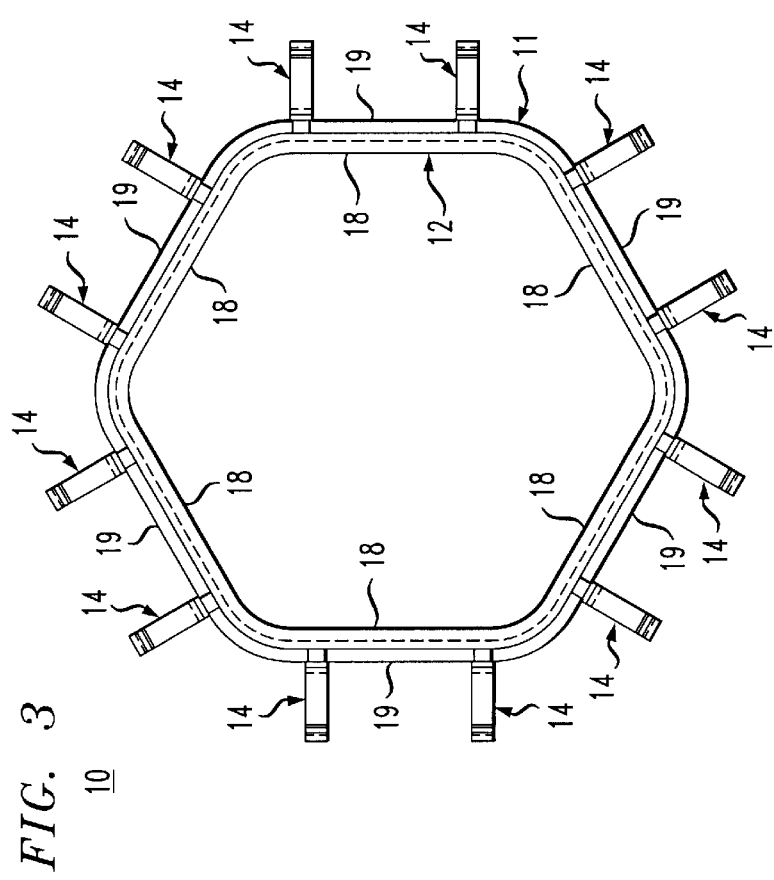
FIG. 3 is a top plan view of the fiber routing device shown in FIG. 2, with a fill complement of troughs attached thereto.
Figure 4:
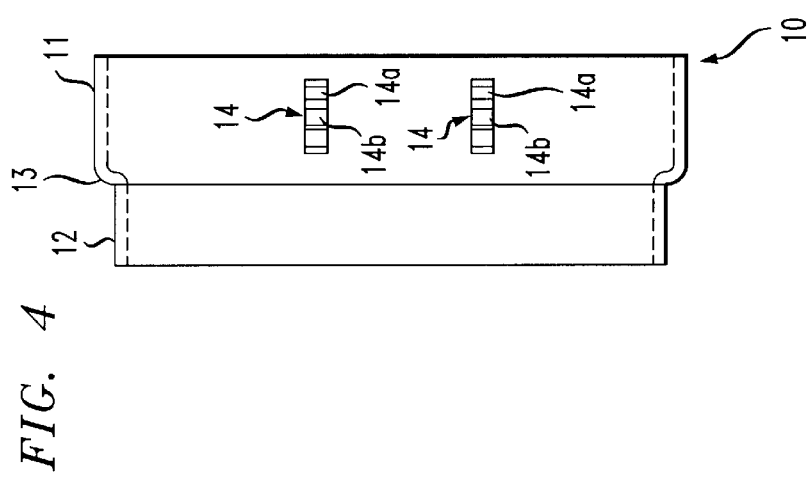
FIG. 4 is a side elevation view of the fiber routing device shown in FIG. 3.

FIGS. 2–4 show the exemplary fiber routing device 10. The fiber routing device 10 has a sleeve in the shape of a closed figure having a plurality of substantially flat sides or a ring. The sleeve of the fiber routing device 10 has a top portion 11, a bottom portion 12, and a shoulder 13 connecting the top and bottom portions. The top portion 11 has an inner dimension ID that is larger than the outer dimension OD of a corresponding location on the bottom portion 12.

Although the exemplary sleeve 11, 12, 13 has six sides 19 (a hexagon), the sleeve may have any number of three or more sides. For a top portion 11 having at least three flat sides 19, the bottom portion 12 has at least three flat sides 18 aligned with the sides 19 of the top portion. Alternatively, the sleeve may be a circular or elliptical ring having a smaller outer diameter (male) portion and a larger inner diameter (female) portion sized to receive the male portion of a similar sleeve.

The sleeve 11, 12, 13 may be formed from sheet metal (e.g., aluminum or steel) or plastic. Exemplary plastics may include, but are not limited to, polyvinyl chloride (PVC), acrylonitrile-butadiene-styrene (ABS), and polycarbonate.

At least one of the flat sides 19 of the top portion 11 has at least one trough 14 attached thereto. In the exemplary embodiment, each of the flat sides 19 of the top portion 11 has two mounting holes 15. Each mounting hole 15 is capable of having a respective trough 14 attached thereto. Each side 19 of the sleeve may have any number of trough mounting holes 15 (or other mounting means), and it is not required for each side 19 to have the same number of holes (or other mounting means).

The troughs 14 are best seen in FIG. 2. The plurality of troughs 14 are detachably mounted on the holes 15 of the top portion 11 of the sleeve of the fiber routing device 10. The exemplary troughs are detachably mounted using latches 14c. Other fasteners (e.g., screws or nuts and bolts) or an adhesive (which may be an epoxy) may be used to attach the troughs. Alternatively, the device 10 may be consist of a single piece; that is, the troughs 14 may be integrally formed from the same piece of material as the sleeve 12, 13, 14.

Each trough has the general configuration of a large open loop with two overlapping ends 14a and 14b. The troughs 14 are preferably made of plastic, such as PVC, ABS or polycarbonate. The loops of the troughs 14 are much longer than the width of the troughs, so that it is easy to deflect the ends 14a and 14b. To route a fiber through one of the troughs 14, one can merely press lightly on the inner end 14a to form an opening large enough to receive a fiber, and insert the fiber sideways into the loop. To remove a fiber from a trough 14, one can pull lightly on the outer end 14b to form an opening large enough to pass the fiber, and remove the fiber sideways through the opening.

Figure 5:
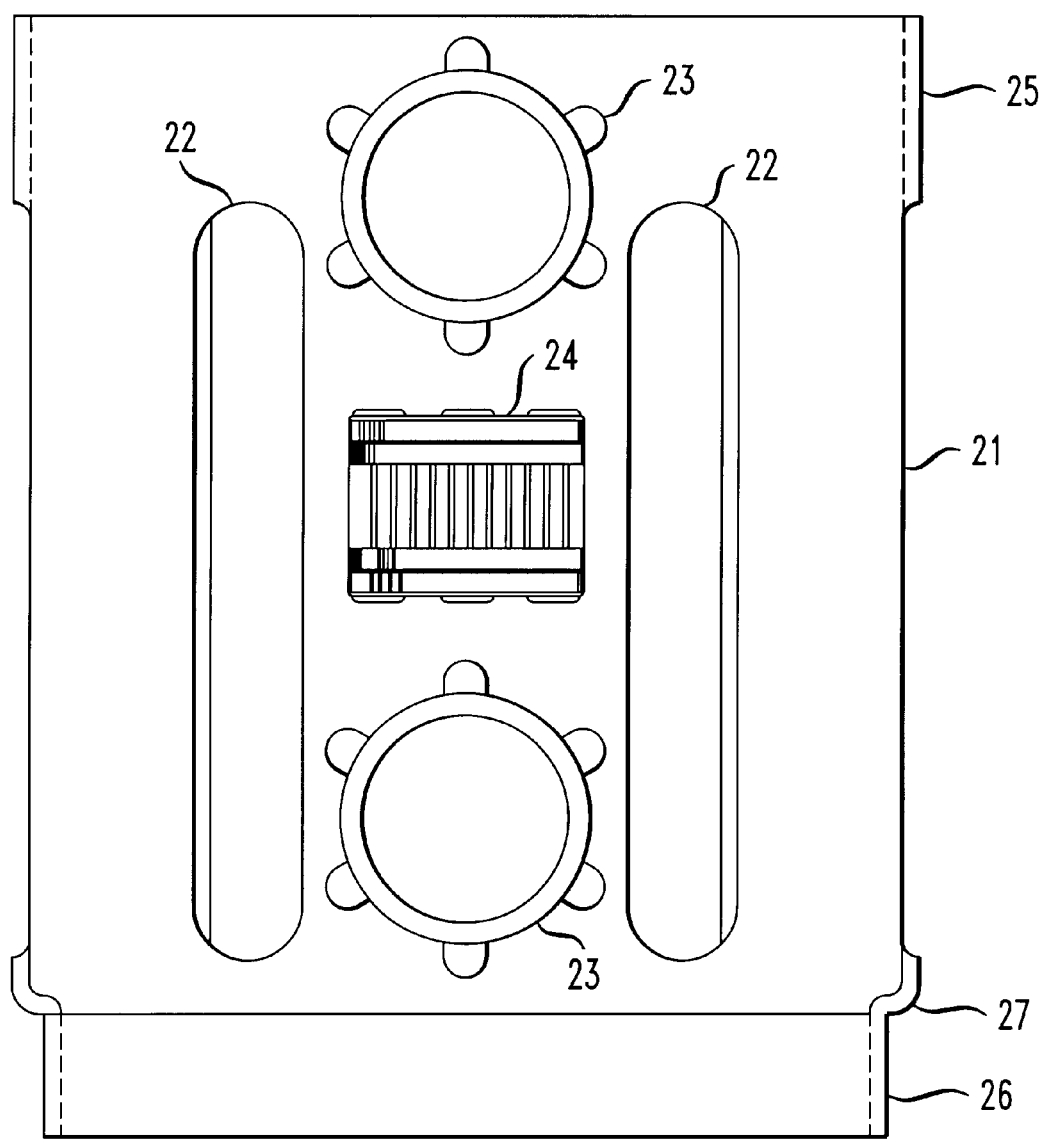
FIG. 5 is a front elevation view of the splice holder assembly shown in FIG. 1.

FIG. 5 shows an exemplary splice holder assembly 20. Assembly 20 has a sleeve 21 in the shape of a closed figure having a plurality of substantially flat sides or a ring. As in the case of the fiber routing device 10, the sleeve 21 may have three or more flat sides, or may be circular or elliptical. The sleeve 21 has a female (top) portion 25 capable of receiving the bottom portion 12 of the fiber routing device 10, and a male (bottom) portion 26 capable of fitting into the top portion 11 of the device 10.

Preferably, top portion 25 has the same cross section (i.e., number of sides and dimensions) as the top portion 11 of device 10, and bottom portion 26 has the same cross section as the bottom portion 12 of device 10. This allows fiber routing devices 10 and splice holder assemblies 20 to be stacked upon each other in any desired order or configuration.

So long as the top and bottom portions 11, 12, 25 and 26 are compatible, the cross section of the central portion of the sleeve 21 may differ from the cross section of the top and bottom portions 25 and 26. For example, it is possible to have hexagonal top and bottom portions 25, 26 with an approximately circular central portion therebetween. Similarly, the top and bottom portions 25, 26 may be circular, with a hexagonal central portion therebetween. One of ordinary skill can readily design a transition between two portions having different cross sections.

The sleeve 21 has at least one hole 22 in at least one side thereof. If the sleeve has a polygonal cross section, the hole 22 may be at the vertex where two sides meet (straddling two sides), or may be closer to the middle of one of the sides. The exemplary assembly 20 has a plurality of holes 22. The hole 22 may have a variety of shapes. A hole 22 having an elongated shape is advantageous because it allows fibers emerging from inside the pedestal 100 to be routed up, down or horizontally without interference. The holes 22 should have rounded corners, or a circular, elliptical or oval shape, so as to avoid damaging the fibers when the fibers contact the edge of the holes. The holes 22 may be evenly spaced around the perimeter of the sleeve 21, or they may be unevenly spaced. The holes 22 may be cut out from, or molded into, the sleeve 21 before installation, or the holes may be cut or punched out as needed. For example, the sleeve 21 may be provided with a plurality of indentations to facilitate punching out the holes 22 as they are required.

The splice holder assembly 20 has at least one splice holder 24 mounted on the side wall of the sleeve 21, near the hole 22. If space permits, more than one splice holder 24 may be arranged in a horizontal row or a vertical column between the holes 22.

A strain relief mechanism is provided. The strain relief mechanism may include one or more strain relief devices. In the exemplary embodiment, a pair of conventional fiber storage barrels or spools 23 provide strain relief. For example, each of two fibers to be spliced together in the splice holder 24 may be wound once around the fiber storage barrels to provide strain relief before routing the bulk of the fiber slack to another part of the system. Alternatively, other conventional strain relief mechanisms may be used.

FIG. 6 is a top plan view of the base 30. Base 30 has at least one side wall 32 connecting the mounting flange 33 to the base plate 31. A hollow 35 is formed inside the side walls 32, for routing fibers from the ground up to the splice holder assemblies 20 and fiber routing devices 10. Preferably, the base 30 is formed of a strong, corrosion resistant material, such as stainless steel or other metal. Strength is desired to protect the assembly in the event that it is kicked. Although the side wall 32 may have any height, it is preferred that the side wall is high enough to raise the base plate 31 above the expected level of water during flooding for the location at which the system 110 is to be installed.

Referring again to FIG. 1, a method of routing fiber is now described. The method includes the steps of: (a) providing first and second splice holders 24 and at least one trough 14, the trough being on a different level from either one of the first and second splice holders 24; and (b) routing a fiber 52 from the first splice holder 24 to the second splice holder 24 by way of the at least one trough 14.

FIG. 1 shows only three exemplary fibers 51, 52 and 53 for ease of viewing. Any number of fibers may be accommodated by a pedestal 100. Fiber 51 has a top portion 51a that is routed inside of the pedestal 100, and winds (at least once) around barrel 23 for strain relief. The portion 51b of fiber 51 emerging from the barrel 23 is spliced to the top portion 52a of fiber 52 at the top splice holder 24.

Fiber 53 has a lower portion 53b that emerges from the ground through base 30 and is routed out through hole 22. Fiber 53 is wound around the lower barrel 23 for strain relief, and the portion 53a of fiber 53 emerging from the barrel 23 is spliced to the bottom portion 52d of fiber 52 at the bottom splice holder 24.

Fiber 52 is routed between the top and bottom splice holders 24 and is spliced at its top and bottom ends to fibers 51 and 53, respectively. For ease of viewing, FIG. 1 shows a fiber 52 that is routed between two splice holders 24 on the same front side of the pedestal 100. However, the configuration and method according to the invention can just as easily allow fibers to be routed between holes 22 and/or splice holders 24 on different sides of the pedestal 100. Thus, although fiber 52 is shown extending 360 degrees around pedestal 100, given splice holders on all six sides of assembly 20, the fiber 52 could readily be extended through any of the angles 0, 60, 120, 180, 240, 300 or 360 around the pedestal. In general, the fiber can be routed through any angle for which routing troughs 14 are provided.

The top portion 52a of fiber 52 is routed from the top splice holder 24 to the barrel 23, and wound around the barrel for strain relief. Portion 52b of fiber 52 is routed through one or more of the troughs 14, until the fiber emerges at a desired side of the pedestal 100, as shown by fiber portion 52c. Fiber portion 52c is wound around barrel 23 for strain relief. The lower portion 52d of fiber 52 emerging from the barrel 23 is then routed to the bottom splice holder 23, where it is spliced to fiber 53.

If a fiber is to be routed between two splice holders 24 on the same side of the pedestal 100, the fiber can be routed 360 degrees by way of the fiber routing device 10 as shown. However, it is also possible to route the fiber directly between the two central barrels 23 without routing the fiber through the troughs 14.

The troughs 14 provide great flexibility in routing fibers between splice holders 24 located at different vertical and/or tangential (circumferential) positions. If all fiber routing were performed at the interior of the pedestal 100, it would be difficult to locate any specific fiber, and the fibers would quickly become entangled as the number of fibers increases. The troughs 14 allow the fiber routing to be performed on the exterior of the pedestal 100, where the fibers are easily visible.

The exemplary system 110 has many advantages. The system is modular and expandable. All of the splice holders 24, barrels 23 and troughs 14 are exposed and within reach. There are no moving parts, so the system 110 is easy to use.

The method may include stacking one of the group consisting of a splice holder assembly 20 and a fiber routing device 10 on the other one of the group consisting of the splice holder assembly and the fiber routing device. In a simple configuration, there may only be one or two splice holder assemblies 20 and one or two fiber routing devices 10. The method may include forming a stack that includes a plurality of splice holder assemblies 20 and a plurality of fiber routing devices 10 as more fibers are installed. The device 10 and assembly 20 may be of the type described above with reference to FIGS. 2–5. The method may also include the step of attaching the at least one trough 14 to the fiber routing device 10.

To grow the pedestal 100 at any time, any desired fiber routing devices 10 and/or splice holder assemblies 20 can be added. If necessary, cover 40 can be replaced with a taller cover to accommodate the enlarged pedestal.

Although the exemplary embodiment is a modular system, it is contemplated that a fiber routing device according to the invention may also incorporate the splice holder function. Thus, one can form a fixed configuration pedestal (not shown) in which a single unitary fiber routing device incorporates the troughs 14 at one level and holes 22, barrels 23 and splice holders 24 at another level. Such a fixed configuration could perform the same fiber organizing and routing functions as the exemplary pedestal 100, but would not be as readily re-configurable (It would still be possible to stack more devices 10 and assemblies 20 on top of the fixed configuration pedestal to increase the number of levels of splice holder assemblies or fiber routing devices).

Although the exemplary pedestal 100 has splice holder assemblies 20 and fiber routing devices 10 that are wider (female) at the top and narrower (male) at the bottom, these subassemblies 10, 20 may each be formed wider (female) at the bottom than at the top. In this variation, each device 10 or assembly 20 would be placed over (rather than inside) the device or assembly beneath it. That is, the male sleeve portions 12, 26 may be positioned at the top of device 10 and assembly 20, respectively.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A device for routing optical fiber, comprising:
   a stackable sleeve in the shape of (a) a closed figure having a plurality of substantially flat sides or (b) a ring, said sleeve having a first portion, a second portion, and a shoulder connecting the first and second portions, said first portion having an inner dimension that is larger than the outer dimension of a corresponding location on said second portion, so that said second portion of said sleeve is shaped to fit into a larger portion of a second, identically-shaped device, and said larger first portion of said sleeve is shaped to receive a smaller portion of the second, identically shaped device; and
   a plurality of troughs attached to an outer surface of the sleeve.

2. The device of claim 1, wherein the top portion of the sleeve has at least three flat sides and the bottom portion of the sleeve has at least three flat sides aligned with the sides of the top portion.

3. The device of claim 2, wherein each of the flat sides of the top portion has at least one of the plurality of troughs attached thereto.

4. The device of claim 3, wherein each of the flat sides of the top portion has two of the plurality of troughs attached thereto.

5. The device of claim 1, wherein the plurality of troughs are detachably mounted on the sleeve.

6. The device of claim 5, wherein each of the troughs is mounted to the sleeve by a latch.

7. A fiber storage system, comprising:
   at least one splice holder assembly comprising:
      a sleeve in the shape of a closed figure having a plurality of substantially flat sides or a ring, the sleeve having at least one hole in at least one side thereof, and
      at least one splice holder mounted on the side wall of the sleeve, near the hole; and
   at least one fiber routing device comprising:
      a sleeve in the shape of a closed figure having a plurality of substantially flat sides or a ring, and
      a plurality of troughs attached to an outer surface of the sleeve,
         wherein the sleeve of the fiber routing device has a first portion, a second portion, and a shoulder connecting the first and second portions, the first portion having an inner dimension that is larger than the outer dimension of a corresponding location on the second portion, and
         at least one of the group consisting of the splice holder assembly and the fiber routing device is stackable on the other one of the group consisting of the splice holder assembly and the fiber routing device.

8. The fiber storage system of claim 7, wherein the splice holder assembly is stackable on top of the fiber routing device, and the fiber routing device is stackable on top of the splice holder assembly.

9. The fiber storage system of claim 7, wherein the first portion has at least three flat sides and the second portion has at least three flat sides aligned with the sides of the first portion.

10. The fiber storage system of claim 9, wherein each of the flat sides of the first portion has at least one of the plurality of troughs attached thereto.

11. The fiber storage system of claim 10, wherein each of the flat sides of the top portion has two of the plurality of troughs attached thereto.

12. The device of claim 7, wherein the plurality of troughs are detachably mounted on the sleeve of the fiber routing device.

13. The fiber storage system of claim 12, wherein each of the troughs is mounted to the sleeve of the fiber routing device by a latch.

14. The fiber storage system of claim 7, wherein the system includes a plurality of splice holder assemblies and a plurality of fiber routing devices arranged in a single stack.

15. The fiber storage system of claim 7, wherein the at least one splice holder assembly has a plurality of holes in side walls thereof, and a plurality of splice holders located between respective ones of the plurality of holes.

16. The fiber storage system of claim 7, wherein the splice holder assembly includes at least one strain relief spool located above or below the at least one splice holder.

17. The fiber storage system of claim 7, further comprising:
   a base beneath a bottommost one of the group consisting of the at least one splice holder assembly and the at least one fiber routing device; and
   a cover sealingly mountable on the base, thereby to form a sealed enclosure that contains the at least one splice holder assembly and the at least one fiber routing device.

18. A method for routing fiber, comprising the steps of:
   (a) providing first and second splice holder assemblies and at least one fiber routing device, the splice holder assembly having at least one splice holder located thereon, the fiber routing device having a sleeve with a first portion, a second portion, and a shoulder connecting the first and second portions, the first portion having an inner dimension that is larger than the outer dimension of a corresponding location on the second portion, the fiber routing device having at least one trough mounted thereon;
   (b) stacking one of the group consisting of one of the splice holder assemblies and the fiber routing device on the other one of the group consisting of the one splice holder assembly and the fiber routing device, wherein the splice holder assemblies and the fiber routing assembly are structured to be stacked on one another in any order when oriented in a common direction; and;
   (c) routing a fiber from the first splice holder to the second splice holder by way of the at least one trough.

19. The method of claim 18, wherein step (b) includes forming a stack that includes a plurality of splice holder assemblies and a plurality of fiber routing devices.

20. The method of claim 18, further comprising sealingly enclosing the splice holder assembly and the fiber routing device within an enclosure, the enclosure comprising a base and a cover.

21. The method of claim 18, further comprising, before step (b), the step of attaching the at least one trough to the fiber routing device.

22. The method of claim 18, wherein step (c) includes winding the fiber around a strain relief device before routing the fiber to the trough.

23. The assembly of claim 7, wherein said sleeve of said fiber routing device has a smaller portion shaped to fit into a larger portion of a sleeve of a second, identically-shaped fiber routing device, and a larger portion of said sleeve of said fiber routing device is shaped to receive a smaller portion of the sleeve of the second fiber routing device.

* * * * *